United States Patent [19]
Chatterji et al.

[11] Patent Number: 6,019,835
[45] Date of Patent: Feb. 1, 2000

[54] CEMENT COMPOSITIONS AND BIODEGRADABLE DISPERSANTS THEREFOR

[75] Inventors: Jiten Chatterji, Duncan; D. Chad Brenneis, Marlow; Dennis W. Gray, Comanche, all of Okla.; Stuart E. Lebo, Schofield; Stephen L. Dickman, Wausau, both of Wis.

[73] Assignees: Halliburton Energy Services, Inc., Duncan, Okla.; LignoTech U.S.A., Inc., Rothschild, Wis.

[21] Appl. No.: 09/144,749

[22] Filed: Sep. 1, 1998

[51] Int. Cl.$^7$ .................................... C04B 24/18
[52] U.S. Cl. .................... 106/725; 106/696; 106/707; 106/781; 106/805; 106/809; 106/823
[58] Field of Search .................................... 106/725, 805, 106/809, 823, 707, 696, 781

[56] References Cited

U.S. PATENT DOCUMENTS

| | | | |
|---|---|---|---|
| 3,359,225 | 12/1967 | Weisend | 260/29.6 |
| 3,672,817 | 6/1972 | Falkehag et al. | 8/524 |
| 3,769,272 | 10/1973 | Hintz | 530/504 |
| 3,865,803 | 2/1975 | Falkehag | 527/400 |
| 4,184,845 | 1/1980 | Lin | 8/34 |
| 4,557,763 | 12/1985 | George et al. | 106/90 |
| 4,818,288 | 4/1989 | Aignesberger et al. | 106/90 |
| 4,846,888 | 7/1989 | Detroit | 106/694 |

*Primary Examiner*—Anthony Green
*Attorney, Agent, or Firm*—Craig W. Roddy; C. Clark Dougherty, Jr.

[57] ABSTRACT

This invention provides improved cement composition and biodegradable dispersants therefor. The biodegradable dispersants are basically comprised of a high molecular weight, phenolic hydroxy group blocked, alkali metal lignosulfonate.

19 Claims, No Drawings

CEMENT COMPOSITIONS AND BIODEGRADABLE DISPERSANTS THEREFOR

BACKGROUND OF THE INVENTION

1. Field of the Invention

The present invention relates to improved cement compositions and novel biodegradable dispersants therefor.

2. Description of the Prior Art

Dispersants are often used in cement compositions utilized in construction for facilitating the mixing of the cement compositions. Also, in the cementing of oil and gas wells and the like, dispersants are extensively used to reduce the apparent viscosities of the cement compositions utilized. The reduction of the apparent viscosity of a cement composition allows the cement composition to be pumped with less friction pressure and utilizing less pump horsepower. In addition, the lower apparent viscosity often allows the cement composition to be pumped in turbulent flow. Turbulent flow characteristics are desirable when pumping cement compositions in oil and gas wells to more efficiently remove drilling fluid from surfaces in the well bore as the drilling fluid is displaced by the cement composition being pumped. The inclusion of dispersants in cement compositions is also desirable in that the presence of the dispersants reduces the water required for preparation of the cement compositions. Cement compositions having reduced water content are characterized by improved compressive strength development.

A number of dispersing agents have been utilized heretofore in cement compositions, particularly in cement compositions used for primary and remedial cementing in oil and gas wells. For example, certain organic acids such as gluconic acid and citric acid have been recognized by those skilled in the art as cement dispersants. However, such organic acids are also strong cement composition set retarding agents which is often undesirable. That is, the presence of an organic acid dispersant in a cement composition prevents the cement composition from setting for a relatively long period of time which is often costly or otherwise detrimental. Other dispersants which are commonly used in hydraulic cement compositions include polynapthalene sulfonate which is commercially available under the trade designation "CFR-2™" from Halliburton Energy Services of Duncan, Okla., the condensation product of formaldehyde, acetone and a sulfite which is commercially available under the trade designation "CFR-3™" from Halliburton Energy Services, poly-B-naphthol sulfonate, polymelamine sulfonate, and many others. While such dispersants function very well in cement compositions, they are not environmentally acceptable, especially in offshore operations, in that they do not undergo complete biodegradation in the environment and cause damage to aquatic and other life therein.

Thus, there are needs for biodegradable cement composition dispersants and improved cement compositions containing such dispersants.

SUMMARY OF THE INVENTION

The present invention provides novel biodegradable dispersants which are useful in cement compositions including those used in cementing oil and gas wells and improved cement compositions containing the biodegradable dispersants which meet the needs described above and overcome the deficiencies of the prior art. The biodegradable dispersants of this invention are basically comprised of a high molecular weight, phenolic hydroxy group blocked, alkali metal lignosulfonate. While lignosulfonates normally function in cement compositions as strong set retarders, the set retarding characteristics of the lignosulfonates of the present invention are substantially eliminated by blocking the phenolic hydroxy group content of the lignosulfonate. That is, in order to minimize the presence of free phenolic hydroxy groups in the lignin, such groups are blocked by reacting the lignosulfonate with propylene oxide.

The improved cement compositions containing the biodegradable dispersant of this invention are basically comprised of a hydraulic cement, sufficient water to form a pumpable slurry and a biodegradable dispersant comprised of a high molecular weight, phenolic hydroxyl group blocked, alkali metal lignosulfonate present in an amount effective to reduce the apparent viscosity of the cement composition.

It is, therefore, a general object of the present invention to provide improved hydraulic cement compositions and biodegradable dispersants therefor.

Other and further objects, features and advantages of the present invention will be readily apparent to those skilled in the art upon a reading of the description of preferred embodiments which follows.

DESCRIPTION OF PREFERRED EMBODIMENTS

As mentioned, the biodegradable cement composition dispersants of this invention are basically comprised of high molecular weight, phenolic hydroxy group blocked, alkali metal lignosulfonates. The alkali metal lignosulfonate used to prepare a dispersant of this invention can be obtained from various pulping processes where lignocellulosic material such as wood, straw, corn stalks and the like are processed to separate the cellulose or pulp from the lignin. For example, in the sulfite pulping process, the lignocellulose material is digested with a bisulfite or sulfite to obtain a sulfonated residual pulping liquor in which the sulfonated lignin is dissolved. Lignins produced in the Kraft, soda and other pulping processes may also be sulfonated with a bisulfite or sulfite to produce a high molecular weight alkali metal lignosulfonate product. The alkali metal lignosulfonates obtained are generally sodium lignosulfonates which contain phenolic hydroxy groups and other organic and inorganic compounds. The presence of these materials causes the lignosulfonates to retard the setting of cement compositions to which they are added.

In the preparation of a biodegradable dispersant of this invention, a variety of isolation methods can be utilized. Preferably, the base lignosulfonate is obtained by ultrafiltration of sulfite liquor containing the lignosulfonate through a 20,000 molecular weight cut-off membrane. The resulting product is a lignosulfonate polymer of high purity having an average molecular weight in the range of from about 60,000 to about 120,000 daltons, preferably about 80,000 daltons. In order to remove the phenolic hydroxyl groups and other similar materials (hereinafter collectively referred to as "phenolic hydroxy groups") from the high molecular weight lignosulfonate obtained to thereby reduce or eliminate its set retarding effect when added to hydraulic cement compositions, the lignosulfonate is subjected to a blocking reaction. Blocking reactions are those which render the phenolic hydroxy groups "blocked", i.e., the groups are rendered nonionizable in alkaline media. The blocking reaction is carried out by reacting the high purity high molecular weight lignosulfonate with propylene oxide under alkaline conditions. For example, the lignosulfonate can be dissolved in water to form an aqueous solution thereof, e.g., a 30% by weight solution. The pH of the solution is then adjusted to about 10.6 using a 45% by weight caustic solution. About 3 millimoles of propylene oxide per gram of lignin in the solution are then added to the solution and the resulting mixture is allowed to react at ambient temperature for about 72 hours. Periodically, the pH is readjusted down to 10.6 using an about 36% by weight sulfuric acid solution. During the reaction, the phenolic hydroxy groups are converted to their corresponding ethers and the unreacted propylene oxide is converted to propylene glycol.

As a result of the blocking reaction, the phenolic hydroxyl content of the lignosulfonate is lowered to in the range of from about 0.01% to about 0.3% by weight of the lignosulfonate, preferably about 0.05%. Stated another way, the high molecular weight, phenolic hydroxyl group blocked, alkali metal lignosulfonate produced contains in the range of from about 0.006 millimoles to about 0.06 millimoles of phenolic hydroxyl groups per gram, preferably about 0.01 millimoles per gram.

The phenolic hydroxyl group blocked alkali metal lignosulfonate, preferably sodium lignosulfonate, functions as an excellent dispersant in aqueous hydraulic cement compositions without substantially affecting the time in which the cement composition sets into a hard substantially impermeable mass. Further, the blocked alkali metal lignosulfonate dispersant is completely biodegradable and does not cause damage to aquatic and other forms of life in the environment.

The improved cement compositions of this invention are basically comprised of a hydraulic cement, sufficient water to form a pumpable slurry and the above described biodegradable dispersant comprised of a high purity, high molecular weight, phenolic hydroxyl group blocked, alkali metal sulfonate present in an amount effective to reduce the apparent viscosity of the cement composition prior to when it gels and sets.

A variety of hydraulic cements can be utilized in accordance with the present invention including those comprised of calcium, aluminum, silicon, oxygen and/or sulfur which set and harden by reaction with water. Such hydraulic cements include, but are not limited to, Portland cements, pozzolana cements, gypsum cements, high alumina content cements, silica cements and high alkalinity cements. Portland cements are generally preferred for use in accordance with the present invention, and Portland cements of the types defined and described in *API Specification For Materials And Testing For Well Cements*, API Specification 10, 5th Edition, dated Jul. 1, 1990 of the American Petroleum Institute are particularly preferred. API Portland cements include classes A, B, C, G and H. API classes G and H are preferred with class H being the most preferred.

The water utilized in the compositions of this invention can be fresh water, salt water, i.e., water containing one or more salts dissolved therein, brine, i.e., saturated salt water produced from subterranean formations, or seawater. Generally, the water can be from any source provided it does not contain an excess of compounds that adversely affect other components in the cement compositions. The water is present in a cement composition of this invention in an amount sufficient to form a pumpable slurry. More particularly, the water is present in the cement compositions in an amount in the range of from about 30% to about 50% by weight of hydraulic cement therein, more preferably in an amount of about 40%.

The biodegradable dispersant of this invention described above is included in the cement compositions of this invention in an amount in the range of from about 0.25% to about 1.5% by weight of cement in the composition. More preferably, the dispersant is present in a cement composition of this invention in an amount in the range of from about 0.5% to about 1% by weight of cement therein, most preferably in an amount of about 0.75%.

A preferred composition of this invention is comprised of a hydraulic cement, water present in an amount in the range of from about 30% to about 50% by weight of cement in the composition and a biodegradable dispersant comprised of a high molecular weight, phenolic hydroxyl group blocked, alkali metal lignosulfonate present in an amount in the range of from about 0.5% to about 1% by weight of cement in the composition.

Another preferred cement composition of this invention is comprised of API Class H Portland cement, water present in an amount of about 38% by weight of cement in the composition and a biodegradable dispersant comprised of a phenolic hydroxyl group blocked sodium lignosulfonate present in an amount of about 0.75% by weight of cement in the composition.

A more preferred cement composition of this invention is comprised of API Class H Portland cement, seawater present in an amount of about 38% by weight of cement in the composition and a biodegradable dispersant comprised of a phenolic hydroxyl group blocked sodium lignosulfonate having a molecular weight of about 80,000 daltons and a phenolic hydroxyl group content of about 0.05% by weight present in said composition in an amount of about 0.75% by weight of cement therein.

In order to shorten the time in which the cement compositions of this invention set and to accelerate early strength development, the compositions can include a set time and strength accelerator such as calcium chloride or sodium chloride. When used, the accelerator is preferably calcium chloride and is present in an amount in the range of from about 1% to about 2% by weight of cement in the compositions, preferably about 2%.

As will be understood by those skilled in the art, when the cement compositions of this invention are utilized for performing primary or remedial well cementing operations, they can also include other conventional well cement additives. For example, the cement compositions can include fluid loss additives, weighting materials, set retarding additives and the like.

In order to further illustrate the cement compositions and biodegradable dispersants of this invention, the following examples are given.

EXAMPLE 1

A number of test cement compositions were prepared using API Class H cement and fresh water. Some of the test compositions contain a prior art dispersant, i.e., the condensation product of acetone, formaldehyde and bisulfite (Halliburton "CFR-3™") and others contained the dispersant of the present invention. In addition, some of the test compositions were formed with water containing sodium chloride in amounts of 18% or 37.2% by weight while others were formed with water containing calcium chloride in an amount of 2% by weight. The test cement composition components and amounts of components are given in Table I below.

TABLE I

Test Cement Compositions[1]

| Composition No. | Water[3] Content, % by wt. of Cement | Prior Art Dipersant[3], % by wt. of Cement | Dispersant of the Present Invention[4], % by wt. of Cement | Sodium Chloride, % by wt. of Cement | Calcium Chloride, % by wt. of Cement | Composition Density, lb/gal |
|---|---|---|---|---|---|---|
| 1  | 39 | —   | —   | —    | — | 16.5 |
| 2  | 39 | 0.5 | —   | —    | — | 16.5 |
| 3  | 39 | —   | 0.5 | —    | — | 16.5 |
| 4  | 39 | 0.5 | —   | —    | 2 | 16.5 |
| 5  | 39 | —   | 0.5 | —    | 2 | 16.5 |
| 6  | 39 | 1   | —   | —    | — | 16.5 |
| 7  | 39 | —   | 1   | —    | — | 16.5 |
| 8  | 39 | 1   | —   | —    | 2 | 16.5 |
| 9  | 39 | —   | 1   | —    | 2 | 16.5 |
| 10 | 38 | —   | —   | 18   | — | 16.8 |
| 11 | 38 | 1   | —   | 18   | — | 16.8 |
| 12 | 38 | —   | 1   | 18   | — | 16.8 |
| 13 | 38 | —   | —   | 37.2 | — | 16.9 |
| 14 | 38 | 1   | —   | 37.2 | — | 16.9 |
| 15 | 38 | —   | 1   | 37.2 | — | 16.9 |
| 16 | 31 | —   | —   | —    | — | 17.5 |
| 17 | 31 | 1   | —   | —    | — | 17.5 |
| 18 | 31 | —   | 1   | —    | — | 17.5 |

[1]Cement utilized was API Class H Joppa cement (Lafarge).
[2]Fresh water.
[3]Halliburton "CFR-3".
[4]High molecular weight, phenolic hydroxyl group blocked, sodium lignosulfonate.

The rheological properties of the test cement compositions were determined in accordance with the *Recommended Practice For Testing Well Cements*, API Recommended Practice 10B, 22nd Edition dated December, 1997 of the American Petroleum Institute. The results of these tests are set forth in Table II below.

TABLE II

Rheological Data Test Results

| Composition No. | Viscosity, cp | | | | | | | | PV | YP |
|---|---|---|---|---|---|---|---|---|---|---|
|  | 600 | 300 | 200 | 100 | 60 | 30 | 6 | 3 | | |
| 1  | 194  | 134  | 114  | 92  | 79  | 61  | 18 | 13 | 60 | 74  |
| 2  | 79   | 31   | 19   | 8   | 4   | 2   | 0  | 0  | 48 | −17 |
| 3  | 70   | 32   | 20   | 9   | 5   | 2   | 0  | 0  | 38 | −6  |
| 4  | 164  | 111  | 94   | 87  | 68  | 63  | 39 | 32 | 53 | 58  |
| 5  | 127  | 77   | 61   | 43  | 35  | 29  | 20 | 15 | 50 | 27  |
| 6  | 97   | 45   | 27   | 12  | 6   | 3   | 0  | 0  | 52 | −7  |
| 7  | 109  | 54   | 35   | 16  | 9   | 4   | 0  | 0  | 55 | −1  |
| 8  | 85   | 45   | 33   | 22  | 17  | 14  | 12 | 12 | 40 | 5   |
| 9  | 104  | 66   | 42   | 23  | 16  | 10  | 5  | 4  | 38 | 28  |
| 10 | 130  | 83   | 67   | 50  | 42  | 34  | 23 | 14 | 47 | 36  |
| 11 | 86   | 38   | 21   | 16  | 9   | 5   | 1  | 1  | 48 | −10 |
| 12 | 104  | 54   | 38   | 20  | 13  | 7   | 2  | 1  | 50 | 4   |
| 13 | 127  | 79   | 61   | 41  | 33  | 25  | 17 | 14 | 48 | 31  |
| 14 | 95   | 42   | 30   | 16  | 11  | 6   | 2  | 1  | 53 | −11 |
| 15 | 96   | 47   | 33   | 19  | 12  | 7   | 3  | 3  | 49 | −2  |
| 16 | 300+ | 300+ | 300+ | 276 | 197 | 123 | 41 | 27 | 0  | 300 |
| 17 | 188  | 88   | 53   | 23  | 12  | 5   | 1  | 0  | 100| −12 |
| 18 | 225  | 112  | 73   | 37  | 21  | 9   | 2  | 0  | 113| −1  |

From Table II it can be seen that the biodegradable dispersant of the present invention imparted properties to cement compositions which compare closely with the properties imparted to the same cement compositions containing a highly accepted prior art non-biodegradable dispersant. Further, the test results in Table II show that the Theological properties of densified cement compositions (Compositions Nos. 16, 17 and 18) compare favorably with similar slurries containing the prior art dispersant.

EXAMPLE 2

Additional test cement compositions comprised of API Class H cement and fresh water were prepared. Some of the test compositions contained the biodegradable dispersant of the present invention while others contained the non-biodegradable prior art dispersant described in Example 1 above. One of the test compositions containing the dispersant of the present invention also contain calcium chloride. The components in the test cement compositions and the quantities thereof are set forth in Table III below.

TABLE III

Test Cement Compositions[1]

| Composition No. | Water[2] Content, % by wt. of Cement | Prior Art Dispersant[3], % by wt. of Cement | Dispersant of the Present Invention[4], % by wt. of Cement | Calcium Chloride, % by wt. of Cement | Composition Density, lb/gal |
|---|---|---|---|---|---|
| 19 | 39 | 0.5 | — | — | 16.5 |
| 20 | 39 | — | 0.5 | — | 16.5 |
| 21 | 39 | 0.75 | — | — | 16.5 |
| 22 | 39 | — | 0.75 | 2 | 16.5 |
| 23 | 39 | — | 0.75 | — | 16.5 |
| 24 | 39 | 0.75 | — | — | 16.5 |
| 25 | 39 | — | 0.75 | — | 16.5 |

[1]Cement utilized was API Class H Joppa cement (Lafarge).
[2]Fresh water.
[3]Halliburton "CFR-3 ™".
[4]High molecular weight, phenolic hydroxyl group blocked, sodium lignosulfonate.

The test compositions described in Table III above were subjected to high temperature, high pressure thickening time tests in accordance with the above mentioned API Recommended Practice 10B. The results of these tests are shown in Table IV below.

TABLE IV

Thickening Time Test Results

| Composition No. | Test Temperature, °F. | Thickening Time, Hr:min |
|---|---|---|
| 19 | 125 | 4:51 |
| 20 | 125 | 8:53 |
| 21 | 140 | 4:38 |
| 22 | 140 | 7:45 |
| 23 | 140 | 12:00 |
| 24 | 160 | 4:30 |
| 25 | 160 | 7:53 |

From Table IV it can be seen that the biodegradable dispersant of the present invention retards the cement composition set time more than the prior art dispersant. However, the presence of 2% calcium chloride in the cement composition containing the biodegradable dispersant of the present invention significantly reduced the set time without sacificing other properties.

EXAMPLE 3

Some of the test compositions given in Table IV above were subjected to compressive strength tests conducted in accordance with the above mentioned API Recommended Practice 10B. The results of these tests are given in Table V below.

TABLE V

Compressive Strength Test Results

| Composition No. | Test Temperature, °F. | 12 Hr. Compressive Strength, psi | 24 hr. Compressive Strength, psi |
|---|---|---|---|
| 21 | 200 | 4300 | 4700 |
| 22 | 200 | 2700 | 3300 |
| 23 | 200 | 2800 | 3500 |

From Table V it can be seen that compressive strengths at 24 hours were comparable and that the addition of 2% calcium chloride to a cement composition containing the dispersant of the present invention increased the set cement compressive strength.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A cement composition comprising:
   a hydraulic cement;
   sufficient water to form a pumpable slurry; and
   a biodegradable dispersant comprised of a phenolic hydroxyl group blocked alkali metal lignosulfonate having a molecular weight in the range of from about 60,000 to about 120,000 daltons present in said composition in an amount effective to reduce the apparent viscosity of said cement composition.

2. The cement composition of claim 1 wherein said hydraulic cement is selected from the group consisting of Portland cements, pozzolana cements, gypsum cements, alumina cements, silica cements and alkaline cements.

3. The cement composition of claim 1 wherein said hydraulic cement is Portland cement.

4. The cement composition of claim 1 wherein said water is comprised of fresh water, salt water, brine or seawater.

5. The cement composition of claim 1 wherein said water is present in an amount in the range of from about 30% to about 50% by weight of cement in said composition.

6. The cement composition of claim 1 wherein said dispersant is present in an amount in the range of from about 0.25% to about 1.5% by weight of cement in said composition.

7. The cement composition of claim 1 wherein said dispersant has a phenolic hydroxyl group content in the range of from about 0.01% to about 0.3% by weight of said dispersant.

8. The cement composition of claim 1 which further comprises calcium chloride present in an amount in the range of from about 1% to about 2% by weight of cement in said composition.

9. A cement composition comprising:
   a hydraulic cement;
   water present in an amount of about 38% by weight of cement in said composition; and
   a biodegradable dispersant comprised of a phenolic hydroxyl group blocked sodium lignosulfonate having a molecular weight of about 80,000 daltons present in an amount of about 0.75% by weight of cement in said composition.

10. The cement composition of claim 9 wherein said hydraulic cement is Portland cement.

11. The cement composition of claim 9 wherein said hydraulic cement is API Class H Portland cement.

12. The cement composition of claim 9 wherein said dispersant has a phenolic hydroxyl group content of about 0.05% by weight of said dispersant.

13. A method of preparing a biodegradable cement composition which has reduced viscosity prior to when the cement composition gels and sets comprising the steps of:

preparing a cement composition comprised of a hydraulic cement and sufficient water to form a pumpable slurry; and combining a biodegradable dispersant with said cement composition in an amount effective to reduce the viscosity thereof comprised of a phenolic hydroxyl group blocked alkali metal lignosulfonate having a molecular weight in the range of from about 60,000 to about 120,000 daltons and having a phenolic hydroxyl group content in the range of from about 0.01% to about 0.1% by weight of said dispersant.

14. The method of claim 13 wherein said hydraulic cement is selected from the group consisting of Portland cements, pozzolana cements, gypsum cements, alumina cements, silica cements and alkaline cements.

15. The method of claim 13 wherein said hydraulic cement is Portland cement.

16. The method of claim 13 wherein said water is comprised of fresh water, salt water, brine or seawater.

17. The method of claim 13 wherein said water is present in an amount in the range of from about 30% to about 50% by weight of cement in said composition.

18. The method of claim 13 wherein said dispersant is present in said composition in an amount in the range of from about 0.25% to about 1.5% by weight of cement in said composition.

19. The method of claim 13 wherein said composition further comprises calcium chloride present therein in an amount in the range of from about 1% to about 2% by weight of cement in said composition.

* * * * *